(12) United States Patent
Smith

(10) Patent No.: US 6,328,329 B1
(45) Date of Patent: Dec. 11, 2001

(54) COLLAPSIBLE SHOPPING CART WITH REMOVABLE MESH BASKET

(76) Inventor: William L. Smith, 5704 Stone Bluff Rd., Louisville, KY (US) 40291

(*) Notice: Subject to any disclaimer, the term of this patent is extended or adjusted under 35 U.S.C. 154(b) by 0 days.

(21) Appl. No.: 09/597,059

(22) Filed: Jun. 20, 2000

(51) Int. Cl.⁷ ...................................................... B62B 1/00
(52) U.S. Cl. ................... 280/639; 280/644; 280/33.991; 280/47.18; 280/47.26; 280/DIG. 4
(58) Field of Search .................... 280/651, 639, 280/33.991, DIG. 3, DIG. 4, 644, 655, 659, 47.34, 47.17, 47.18, 47.26, 79.2

(56) References Cited

U.S. PATENT DOCUMENTS

| | | | |
|---|---|---|---|
| 1,397,693 | * 11/1921 | Leonard et al. | 280/651 |
| 2,020,766 | * 11/1935 | Brown | 280/639 |
| 3,197,223 | * 7/1965 | Dickerson et al. | 280/651 |
| 3,291,501 | * 12/1966 | Steiniceanu | 280/651 |
| 3,810,648 | * 5/1974 | Hallenius | 280/33.991 |
| 4,946,187 | 8/1990 | Chang . | |
| 4,953,878 | * 9/1990 | Sbragia | 280/30 |
| 4,989,889 | 2/1991 | Perez . | |
| 5,080,387 | 1/1992 | Ryals . | |
| 5,388,854 | 2/1995 | Kappaz . | |
| 5,536,034 | * 7/1996 | Miller | 280/651 |
| 5,562,299 | 10/1996 | Morrissette . | |
| 5,575,605 | 11/1996 | Fisher . | |
| 5,915,722 | * 6/1999 | Thrasher et al. | 280/649 |
| 6,042,128 | * 3/2000 | Dinkins | 280/47.18 |

* cited by examiner

Primary Examiner—J. J. Swann
Assistant Examiner—James S. McClellan
(74) Attorney, Agent, or Firm—McCullough & Associates

(57) ABSTRACT

The present invention would be a collapsible shopping cart fabricated from plastic or metal. The front and rear sides of the shopping cart of the present invention would be connected to a lower frame at pivot points, allowing the sides to fold down against the lower frame as needed. Four wheels would also be attached to this lower frame. One side of the cart would be curved or rounded at its top, serving as the cart's push handle, with a cross member support bar attached between the outer support arms. The other side of the cart would have additional horizontal support arms attached to the pivot points at the top of its outer support arms, with these horizontal support arms having incorporated hooks at their ends that would allow the horizontal supports to be secured to the cross member support bar on the opposite side of the cart, creating the cart's upper support frame. The present invention would also come with a mesh basket having a solid bottom and attached eyelets at each corner, with this basket being secured to incorporated hooks on each side of the cart.

2 Claims, 2 Drawing Sheets

COLLAPSIBLE SHOPPING CART WITH REMOVABLE MESH BASKET

I. BACKGROUND OF THE INVENTION

The present invention relates to that of a new and improved shopping cart, and more specifically relates to a shopping cart which is a collapsible folding shopping cart.

II. DESCRIPTION OF THE PRIOR ART

U.S. Pat. No. 5,575,605, issued to Fisher, discloses a collapsible, wheeled shopping cart, having a horizontal shelf which is vertically moveable for easy loading and/or unloading, and having a surrounding skirt that is hinged so as to be collapsible when not in use.

U.S. Pat. No. 5,562,299, issued to Morrissette, discloses a collapsible cart comprising a collapsible storage basket which is mounted on a frame consisting of a longitudinal frame member and a horizontal cross frame member.

U.S. Pat. No. 5,388,854, issued to Kappaz, discloses a small foldable shopping cart having as large central load supporting section define between front and rear U-shaped frames and pivotally connected to a handle also U-shaped whose shanks provide rests below the central load-supporting system.

U.S. Pat. No. 5,080,387, issued to Reals, discloses a collapsible utility carrier which has an expandable load bearing base frame supported by a rear upright member having wheels attached thereto and a forward upright member having a handle.

U.S. Pat. No. 4,989,889, issued to Server Perez, discloses a foldable cart for shopping, having a rigid base for reinforcement of the bag bottom.

U.S. Pat. No. 4,946,187, issued to Chang, discloses a portable carrier which comprises a frame such as a handle frame defined by a handlebar and a pair of parallel handlebar tubes, and a luggage frame defined by a front tube and a pair of parallel side tubes.

III. SUMMARY OF THE INVENTION

The present invention would be a collapsible shopping cart fabricated from plastic or metal. The front and rear sides of the shopping cart of the present invention would be connected to a lower frame at pivot points, allowing the sides to fold down against the lower frame as needed. Four wheels would also be attached to this lower frame. One side of the cart would be curved or rounded at its top, serving as the cart's push handle, with a cross member support bar attached between the outer support arms. The other side of the cart would have additional horizontal support arms attached to the pivot points at the top of its outer support arms, with these horizontal support arms having incorporated hooks at their ends that would allow the horizontal supports to be secured to the cross member support bar on the opposite side of the cart, creating the cart's upper support frame.

The present invention would also come with a mesh basket having a solid bottom and attached eyelets at each corner, with this basket being secured to incorporated hooks on each side of the cart.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regard as including such equivalent constructions insofar as they do not depart from the spirit and scope of the present invention.

It is therefore an object of the present invention to provide a new and improved collapsible shopping cart that has all of the advantages of the prior art and none of the disadvantages.

It is another object of the present invention to provide a new and improved collapsible shopping cart which may be easily and efficiently manufactured and marketed.

It is another object of the present invention to provide a new and improved collapsible shopping cart which is of durable and reliable construction.

It is yet another object of the present invention to provide a new and improved collapsible shopping cart which is economically affordable and available to the buying public.

It is yet another object of the present invention to provide a new and improved collapsible shopping cart that is easy to use.

It is still another object of the present invention to provide a new and improved collapsible shopping cart that is lightweight.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figures 1, 2, 3:
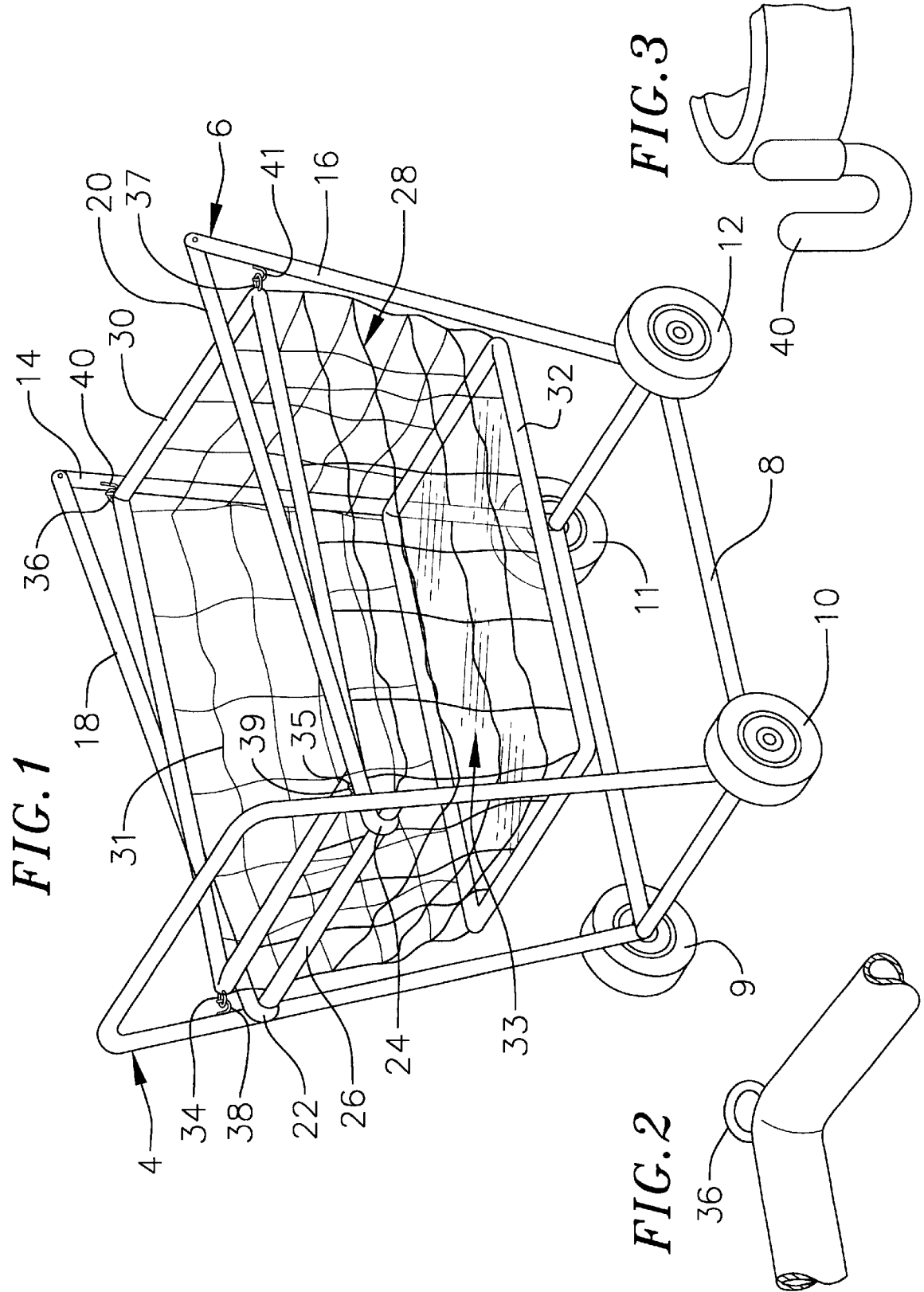
FIG. 1 shows a perspective view of the shopping cart of the present invention.
FIG. 2 shows a perspective view of an eyelet of the present invention.
FIG. 3 shows a isometric view of a hook of the present invention.

FIG. 1 show a perspective view of shopping cart 2 of the present invention. Shopping cart 2 has a front side, a rear side, a left side and a right side. Front side 4 and rear side 6 would be attached to lower frame 8, which would be fabricated from hollow tubing, with the hollow tubing being either plastic or metal. Lower frame 8 would be set up in a rectangular configuration, having two shorter sides and two longer sides. The front side and rear side of shopping cart 2 would be the two shorter sides, while the left side and right side of shopping cart 2 would be the two longer sides.

Attached to each corner of lower frame 8 would be wheels 9, 10, 11, and 12. Wheels 9 through 12 would be attached in a direction parallel to the left side and right side of the shopping cart 2, allowing lower frame 8 to rest a few inches above the ground.

Front section 4 of shopping cart 2 would be fabricated in a U-shaped apparatus, and would have a left pole, a right pole, and a top cross-member bar. The left pole, right pole, and top cross-member bar would each have two ends, a first end and a second end. The first end of the left pole of front section 4 would be pivotally attached to the left front corner of lower frame 8 in between wheel 9 and lower frame 8. The first end of the right pole of front section 4 would be pivotally attached to the right front corner of lower frame 8 in between wheel 10 and lower frame 8. The first end of the top cross-member bar would be attached to the second end of the left pole, with the second end of the top cross-member bar being attached to the second end of the right pole.

As previously stated, front section 4 would be pivotally attached to lower frame 8, but would have limitations in movement. Front section 4 could be folded down and rest on top of lower frame 8. When completely pulled upright in the opposite direction, front section 4 would be self-sustaining while making approximately a 100 degree angle with lower frame 8. Front section 4 would be prevented from extending any further than approximately a 100 degree angle when lower frame 8 would be resting flat on the ground on wheels 9 through 12.

Front section 4 of shopping cart 2 would also have lower cross member support bar 26. Lower cross member support bar 26 would have two ends, a first end and a second end. The first end of lower cross member support bar 26 would be attached to the left pole of front section 4 approximately nine inches to one foot from the point where the first end of the top cross-member bar attaches to the second end of the left pole. The second end of lower cross-member support bar 26 would be attached to the right pole of front section 4 approximately nine inches to one foot from the point where the second end of the top cross-member bar attaches to the second end of the right pole.

The rear section 6 of shopping cart 2 would include vertical support arms 14 and 16 and horizontal support arms 18 and 20. Vertical support arms 14 and 16 would each have two ends, a first end and a second end. The first end of vertical support arm 14 would be pivotally attached to the left rear side of lower frame 8 in between wheel 11 and lower frame 8. The first end of vertical support arm 16 would be pivotally attached to the right rear side of lower frame 8 in between wheel 12 and lower frame 8.

Horizontal support arms 18 and 20 would each have two ends, a first end and a second end. The first end of horizontal support arm 18 would be pivotally attached to the second end of vertical support arm 14, with the second end of horizontal support arm 18 being attached to the top surface of lower member support bar 26. The second end of horizontal support arm 18 would have hook 22, which would allow the second end of horizontal support arm 18 to be easily placed on top of lower cross member support bar 26 and help retain the support frame of shopping cart 2.

The first end of horizontal support arm 20 would be pivotally attached to the second end of vertical support arm 16, with the second end of horizontal support arm 20 being attached to the top surface of lower cross member support bar 26. The second end of horizontal support arm 20 would have hook 24, which would allow the second end of horizontal support arm 20 to be easily placed on top of lower cross member support bar 26 and help retain the support frame of shopping cart 2.

Vertical support arms 14 and 16 would be capable of being folded flat on top of lower frame 8. When extended fully upright, vertical support arms 14 and 16 would form approximately a 100 degree angle with that of the lower frame 8 once vertical support arms 14 and 16 are in this position. Hooks 22 and 24 on horizontal support arms 18 and 20, respectively, can be placed on top of lower cross member support bar 26 in order to create the outer frame of shopping cart 2.

The present invention would also utilize mesh basket 28, which would comprise upper support frame 30, lower support frame 32, mesh 31, and flooring 33. Upper support frame 30 and lower support frame 32 would each be a rectangular configuration of tubing, with lower support frame 32 being smaller in both dimensions than those of upper support frame 30. Flooring 33 would be attached to lower support frame 32, which would give mesh basket 28 a solid bottom surface in which to place objects within. Further, the present invention would include mesh 31, which would connect upper support frame 30 at all points to lower support frame 32.

Mesh basket 28 would also include eyelets 34, 35, 36, and 37. Each eyelet of the present invention would be attached to an outside corner of upper support frame 30 of mesh basket 28. Each eyelet located on mesh basket 28 would hook up with one of hook components 38, 39, 40, and 41. Each of the hook components would be located and fixably attached to shopping cart 2 of the present invention. Hooks 38 and 39 would be attached to the left pole and right pole, respectively, of the front section 4 of shopping cart 2, while hook components 40 and 41 would be attached to vertical support arms 14 and 16 of rear section 6, respectively. The connection provided by the four eyelet/hook component combinations would allow mesh basket 28 to be removably hung within the support frame of shopping cart 2. Further, a user would be able to place items in shopping cart 2 while shopping, knowing that the present invention would be secure and sturdy.

FIG. 2 shows a perspective view of an eyelet of the present invention. As can be seen, the eyelet, which is representative of any of the four eyelets of the present invention, is attached to an outside corner of upper support frame 30 of mesh basket 28.

FIG. 3 shows an isometric view of a hook component of the present invention. As previously discussed, the hook components of the present invention would be attached to various places on the support frame of shopping cart 2. The diagram of the hook component in FIG. 3 is meant to be representative of any of the four hook components used with the present invention.

Figure 4:
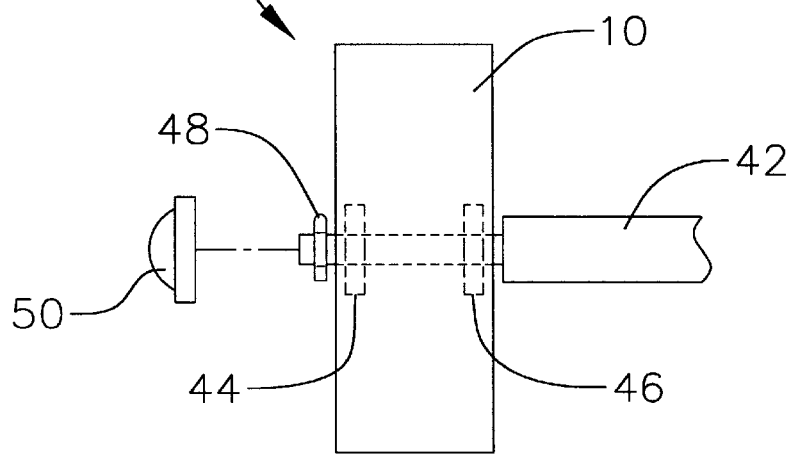
FIG. 4 shows a side view of a wheel assembly used with the present invention.

FIG. 4 shows a side view of a wheel assembly used with the present invention. Wheel assembly 43 is shown with wheel 8, which is centrally mounted on axle 42. Cotter pin 48 is placed on axle 42 in order to maintain wheel 8 on axle 42. Top metal cap 50 is placed over cotter pin 48 in order to ensure that no jagged edges or appropriate surfaces are left to contact the open air. Bearings 44 and 46 are placed on axle 32.

Figure 5:
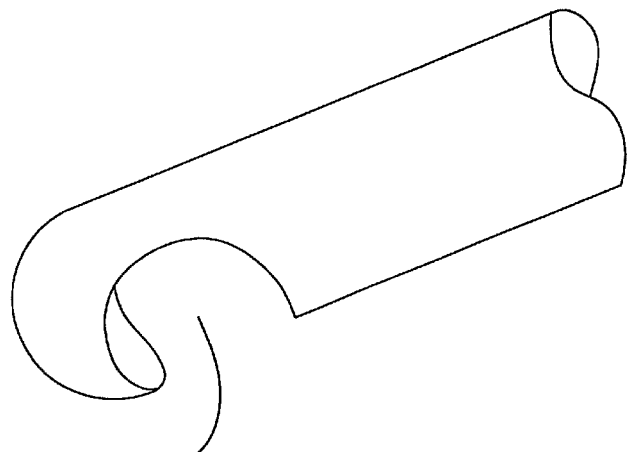
FIG. 5 shows a side view of a hook of the present invention.

FIG. 5 shows a side view of a hook of the present invention. This drawing, designed to represent hooks 22 and 24, are located on the second ends of horizontal support arms 18 and 20, and are meant to be placed on top of lower cross member support bar 26. Hooks 22 and 24, as can be seen in FIG. 5, are nothing more than indentations in a circular length of tubing. However, this indentation is capable of resting on lower cross-member support bar 26 and provide adequate sturdiness to shopping cart 2 of the present invention.

Figure 6:
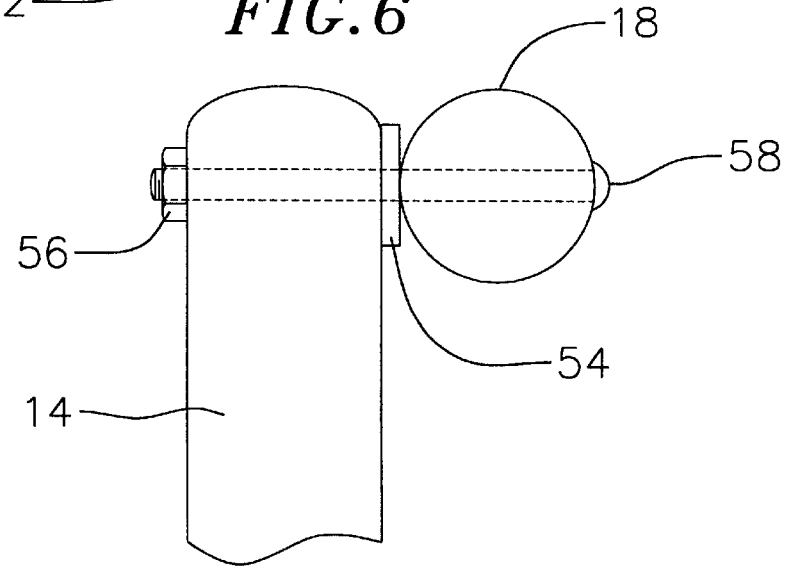
FIG. 6 shows a top view of a joint assembly showing the attachment of a vertical support an to a horizontal support arm of the present invention.

FIG. 6 shows a top view of joint assembly 51 of the present invention, showing the attachment of a vertical support arm to a horizontal support arm. As can be seen, the vertical support arm is attached to the horizontal support arm by a continuous shaft, and a washer 54 that is attached to the shaft between the vertical support arm and the horizontal support arm. Lock nuts 56 and 58 would be attached to either end of the shaft in order to ensure that the vertical support arm component and the horizontal support arm component would remain pivotally attached to one another.

What I claim as my invention is:

1. A collapsible shopping cart comprising:

a. a lower frame fabricated from hollow tubing, the lower frame being rectangularly shaped and having four sides, two of the four sides being longer sides and two of the sides being shorter sides, the two shorter sides comprising the front side of the lower frame and the rear side of the lower frame, and the two longer sides comprising the left side of the lower frame and the right side of the lower frame, the lower frame having four corners, a left front corner, a left rear corner, a right front corner, and a right rear corner, b. a quartet of wheels, each wheel attached to the corner of the lower frame, each wheel being attached in a direction parallel to the left side of the lower frame and the right side of the lower frame, the quartet of wheels allowing the lower frame to rest a few inches above the ground, c. a front section pivotally attached to the lower frame, the front section comprising a left pole, a right pole, an upper cross-member support bar, and a lower cross-member support bar, the left pole having two ends, a first end and a second end, the right pole having two ends, a first end and a second end, the upper cross-member support bar having two ends, a first end and a second end, the lower cross-member support bar having two ends, a first end and a second end, the first end of the left pole pivotally attached to the left front corner of the lower frame in between a wheel and the lower frame, the first end of the right pole being pivotally attached to the right front corner of the lower frame in between a wheel and the lower frame, the first end of the upper cross-member bar being attached to the second end of the left pole, the second end of the upper cross-member bar attached to the second end of the right pole, the first end of lower cross-member support bar being attached to the left pole approximately nine inches to one foot below the point where the first end of the upper cross-member support bar attaches to the second end of the left pole, the second end of the lower cross-member support bar attached to the right pole approximately nine inches to one foot from the point where the second end of the upper cross-member support bar attaches to the second end of the right pole, the front section being extendible to approximately a 100 degree angle with that of the lower frame, with the front section being capable of being rotated to be placed flat on top of the lower frame, d. a rear section, the rear section comprising a pair of vertical support arms, a left vertical support arm and a right vertical support arm, and a pair of horizontal support arms, a left horizontal support arm and a right horizontal support arm, the left vertical support arm including two ends, a first end and a second end, the right vertical support arm including two ends, a first end and a second end, the left horizontal support arm having two ends, a first end and a second, and the right horizontal support arm having two ends, a first end and a second end, the first end of the left vertical support arm being pivotally attached to the left rear corner of the lower frame in between a wheel and the lower frame, the first end of the right vertical support arm pivotally attached to the right rear corner in between a wheel and the lower frame, the first end of the left horizontal support arm pivotally attached to the second end of the left vertical support arm the second end of the left horizontal support arm including an end-mounted hook, the first end of the right horizontal support arm being pivotally attached to the second end of the right vertical support arm, the second end of the right horizontal arm including an end-mounted hook, whereby the hooks on the second end of the left horizontal support arm and the second end of the right horizontal support arm would be placed on the top surface of the lower cross-member support bar, the rear section being extendible to approximately a 100 degree angle with that of the lower frame, and the rear section also being capable of being rotated to be placed flat on top of the lower frame, e. a mesh basket, the mesh basket comprising an upper support frame, a lower support frame, mesh, and flooring, both the upper support frame and the lower support frame being fabricated from hollow tubing, both the upper support frame and the lower support frame being fabricated in a rectangular shape, the lower support frame having smaller dimensions than those of the upper support frame, the flooring attached to the lower support frame, the flooring being solid, the mesh connecting the upper support frame to the lower support frame, the upper support frame having four corners, a left front corner, a left rear corner, a right front corner, and a right rear corner, f. mounting means to mount the mesh basket to the front section and rear section of the present invention.

2. A collapsible shopping cart according to claim 1, wherein the mounting means further comprises:

a. a quartet of eyelets, the quartet comprising a first eyelet, a second eyelet, a third eyelet, and a fourth eyelet, the first eyelet attached to the outside of the left front corner of the upper support frame of the mesh basket, the second eyelet attached to the outside of the left rear corner of the upper support frame of the mesh basket, the third eyelet attached to the outside of the right front corner of the upper support frame of the mesh basket, the fourth eyelet attached to the outside of the right rear corner of the upper support frame of the mesh basket, each of the eyelets extending outward from each corner of the mesh basket in a diagonal manner, b. a quartet of hook components, the quartet of hook components comprising a first hook component, a second hook component, a third hook component, and a fourth hook component, the first hook component being attached to the left pole of the front section, the second hook component being attached to the left vertical support arm of the rear section, the third hook component being attached to the right pole of the front section, and the fourth hook component being attached to the right vertical support arm of the rear section, whereby each of the hook components would extend inward from each attachment point in a diagonal fashion, c. whereby a user would loop the first eyelet over the first hook component, the second eyelet over the second hook component, the third eyelet over the third hook component, and the fourth eyelet over the fourth hook component, thereby effectively mounting the mesh basket within and onto the present invention.

* * * * *